UNITED STATES PATENT OFFICE.

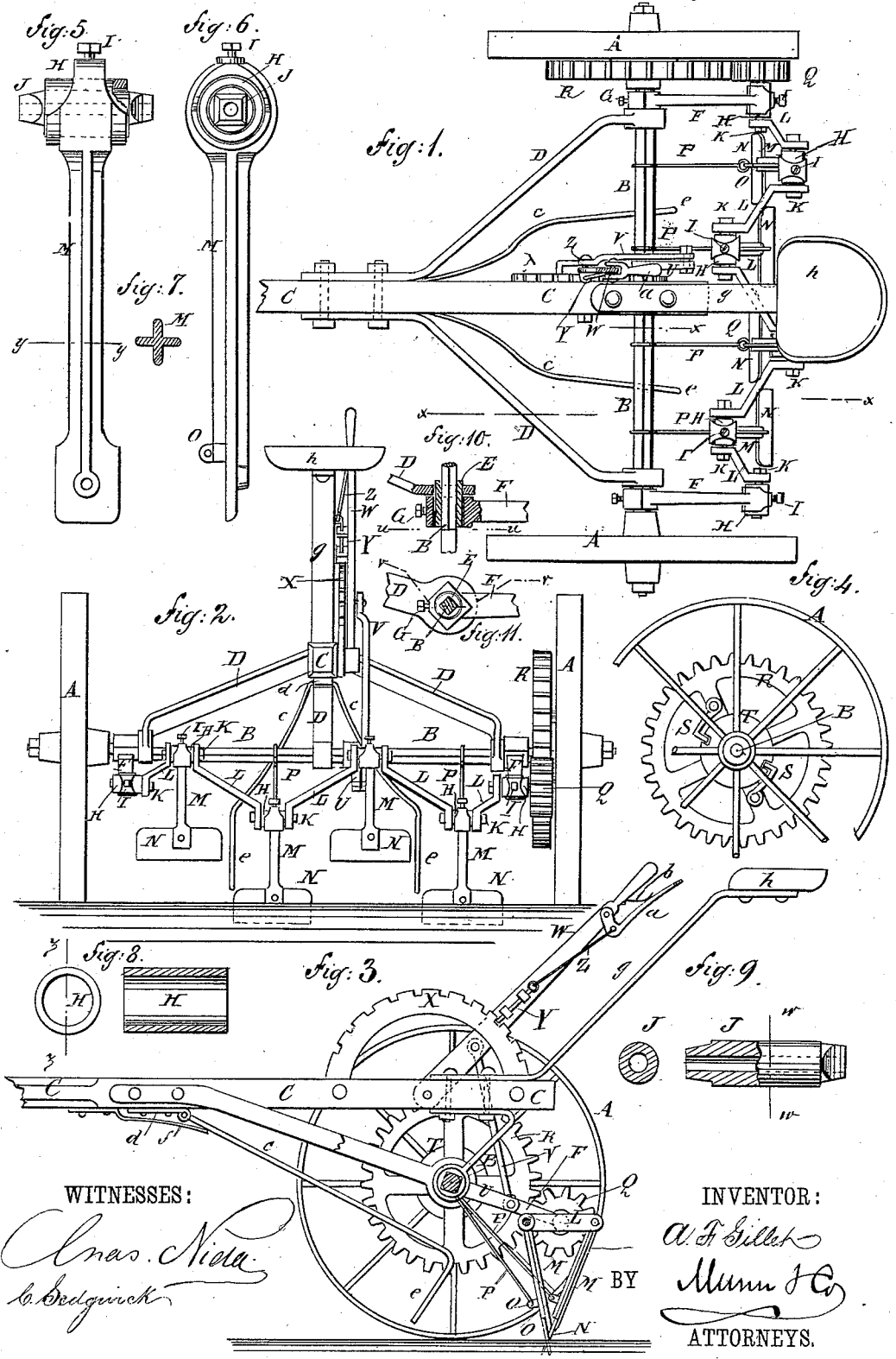

ALEXIS FRANÇOIS GILLET, OF BURLINGTON JUNCTION, MISSOURI.

SULKY CORNSTALK-CUTTER.

SPECIFICATION forming part of Letters Patent No. 302,393, dated July 22, 1884.

Application filed November 17, 1883. (No model.)

*To all whom it may concern:*

Be it known that I, ALEXIS F. GILLET, of Burlington Junction, Nodaway county, Missouri, have invented a new and useful Improvement in Sulky Cornstalk-Cutters, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a rear elevation of the same. Fig. 3 is a sectional side elevation of the same, taken through the line $x\ x\ x$, Fig. 1. Fig. 4 is a side elevation of a part of the drive-wheel and its attached gear-wheel. Fig. 5 is a rear elevation of one of the knife-arms. Fig. 6 is a side elevation of the same. Fig. 7 is a cross-section of the same, taken through the line $y\ y$, Fig. 5. Fig. 8 is an end elevation of one of the pivot-boxes, and a sectional side elevation of the same, taken through the line $z\ z$. Fig. 9 is a side elevation, partly in section, of one of the cutter-arm pivots, and a sectional end elevation of the same, taken through the line $w\ w$. Fig. 10 is a sectional plan view of the crank shaft arm eye, the brace-eye, and their bearing-box, shown as applied to the axle, taken through the line $v\ v$, Fig. 11; and Fig. 11 is a side elevation of the same, the axle being shown in section through the line $u\ u$, Fig. 10.

The object of this invention is to facilitate the cutting of cornstalks in the field, to prepare the ground for plowing, and also to promote convenience in controlling the cutting-machine.

The invention consists in the construction and arrangement of parts, as will be hereinafter described and claimed.

A are the drive-wheels, which revolve upon the journals of the square axle B.

C is the tongue, which is connected with the axle B by the three bars D, the central one of which is bolted at its upper end to the lower side of the said tongue C near its rear end. The forward ends of the side bars, D, are bolted to the opposite sides of the tongue C at a distance from its rear end. The lower ends of the bars D have round holes formed through them to fit upon the bearing-boxes E, the interior of which is made square to receive and fit upon the square axle B. The bearing-boxes E are made sufficiently long to receive upon their outer ends the forward ends of the arms F, which are adjustably secured to the said bearing-boxes by set-screws G.

In the rear ends of the arms F are formed holes to receive the bearing-boxes H, to which they are secured by set-screws I. The bearing-boxes H have cylindrical interiors to receive and fit upon the pivots J, the ends of which are squared, and which are perforated longitudinally to receive the bolts K, by means of which the said pivots are secured at their inner ends to the end sections, L, of the crank-shaft. The end sections, L, are made short, and the intermediate sections are made long, as shown in Figs. 1 and 2. The crank-shaft is formed of five (more or less) sections, L, the adjacent ends of which are connected by bolts K, pivots J, and bearing-boxes H, constructed as hereinbefore described.

Upon the intermediate bearing-boxes H are placed the upper ends of the knife-arms M, which are secured in place upon the said bearing-boxes by set-screws I, and to the lower ends of which are bolted the cutters N, so that the said cutters will be moved up and down by the revolution of the crank-shaft L.

Upon the forward side of the lower parts of the knife-arms M are formed perforated lugs O, into which are hooked the rear ends of the rods P, the forward ends of which have eyes formed upon them to receive and turn upon the axle B, so that the knife-arms M will be kept in proper position while being raised and lowered by the revolution of the crank-shaft L. The knife-arms M are made with ribs upon their front and rear sides, to allow them to be made light while having the requisite strength.

In the drawings the sections L of the crank-shaft are shown as so arranged that two cutters, N, will come in contact with the ground at the same time; but I prefer to so arrange the said sections that only one cutter will come to the ground at a time.

To the outer end of one of the side pivots, J, is secured by the bolt K a small gear-wheel, Q, the teeth of which mesh into the teeth of the large gear-wheel R. The gear-wheel R runs loose upon the hub of the drive-wheel A, and to it are pivoted hook-pawls S, which engage with slots in the rim of the catch wheel or disk T, attached to the hub of the said drive-wheel A. When it is desired that the crank-shaft L should not rotate, the hook-pawls S are turned back from the catch-disk T.

To the axle B is rigidly attached an arm, V, to the outer end of which is pivoted the lower end of a connecting-rod, V. The upper end of the connecting-rod V is pivoted to the lever W, the lower end of which is pivoted to the side of the tongue C at a little distance from its rear end. The lever W projects upward across the side of the arched catch-bar X, having teeth upon its upper edge, with which engages a pawl, Y, which slides in keepers attached to the lever W.

To the upper end of the pawl Y is attached the lower end of the connecting-rod Z, the upper end of which is attached to a small elbow-lever, $a$, pivoted to the said lever W. The free end of the lever $a$ is held out from the lever W, holding the pawl Y in gear with the catch-bar X by a spring, $b$, attached to one or the other of the said levers. With this construction, by adjusting the lever W, the crank-shaft L can be raised or lowered to cause the cutters N to enter the ground to a greater or less depth, and can be raised to keep the cutters out of contact with the ground for convenience in turning around.

$c$ is a rod, the center of which passes through the eye of an eye-plate, $d$, attached to the lower side of the tongue C. The arms of the rod $c$ are bent to the rearward and have downwardly-projecting hooks $e$ formed upon them. The hook-arms $c\ e$ are held from swinging down too low by a keeper, $f$, attached to the lower side of the tongue C, with its free end beneath the said arms $c\ e$. With this construction, as the machine is drawn forward, the hooks $c\ e$ straighten any stalks that may be inclined or lying across the rows, so that they will be cut by the cutters N.

To the rear end of the tongue C is attached the lower end of an inclined standard, $g$, to the upper end of which is attached the driver's seat $h$.

The machine may be made narrow to cut a single row of stalks, or wider to cut two or three rows at a time, as may be desired.

Having thus described my invention, I claim as new and desire to secure by Letters Patent—

1. The combination of the arms F, mounted at their inner ends on bearings E on axle B, and at their outer ends carrying the removable boxes H, pivots J, and bolts K, with the sectional crank-shaft, the outer arms, L, of which are secured to said pivot-blocks J by bolts K, and the intermediate sections, L, also connected at their adjacent ends by similar boxes, pivot-blocks, and bolts, and the knife-arms M, mounted on said boxes H, substantially as set forth.

2. The wheels A, loosely mounted on axle B, and one of said wheels having rigidly secured to its hub a notched disk, T, and also having a gear-wheel, R, loose upon the hub, and provided with two hook-pawls, S, in combination with the arms F, carrying the crank-axle L, the ends of which are secured by bolts K to pivot-blocks J, working in removable boxes H on said arms F, one of said pivot-blocks also carrying the pinion Q, which gears with wheel R and causes the crank to rotate when the pawl-hooks engage the notched disk, substantially as set forth.

3. In a sulky cornstalk-cutter, the combination, with the sections L of the crank-shaft, and the arms M, carrying the cutters, of the bearing-box H, the pivot J, the fastening-bolt K, and the set-screw I, substantially as herein shown and described, whereby the wearing parts can be readily renewed, as set forth.

ALEXIS FRANÇOIS GILLET.

Witnesses:
LOUIS GILLET,
GEO. W. MAY,
W. J. NELSON.